United States Patent Office 2,794,631
Patented June 4, 1957

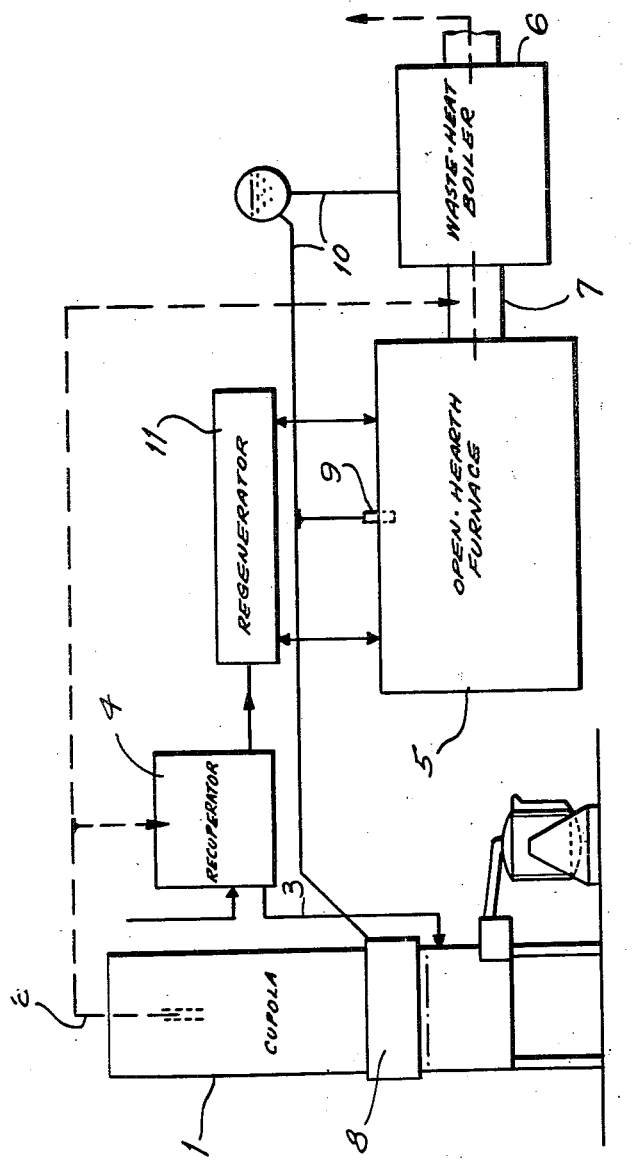

2,794,631

COMBINED STEEL PRODUCING AND HEAT GENERATING APPARATUS

Ernst Becker and Ernst Löbbecke, Gummersbach, Germany

Application March 16, 1954, Serial No. 416,644

Claims priority, application Germany March 18, 1953

5 Claims. (Cl. 266—13)

The present invention relates to an apparatus for generating heat in the use of a steel producing plant and for using the generated heat in the operation of the steel producing plant.

More particularly, the present invention relates to a fuel-fired plant for the production of steel, and in particular to a Siemens-Martin furnace, also called an open hearth furnace, and the combination therewith of a melting furnace such as a cupola furnace and of a heat generating apparatus utilizing the waste gases of the open hearth and cupola furnaces for generating heat.

It is an object of the present invention to obtain increased economy in the operation of steel making apparatus of the above type.

It is another object of the present invention to combine a heat generating apparatus with steel making apparatus of the above type in order to more fully and effectively utilize the heat from the hot waste gases produced thereby.

Other objects and advantages will become apparent from the following description and the appended claims.

With the above objects in view, the present invention mainly consists in a combined steel producing and heat generating apparatus which comprises, in combination, pre-melting means for pre-melting iron material adapted to be made into steel and having waste gas discharge means for discharging hot waste gases, steel producing means for making steel from molten iron material and having waste gas discharge means for discharging hot waste gases, and heat generating means connected to the waste gas discharge means of at least one of the pre-melting means and the steel producing means for receiving and utilizing hot waste gases discharged therefrom for generating heat.

In accordance with the invention, the pre-melting means is preferably a cupola furnace, and the steel producing means is preferably an open hearth furnace, otherwise called a Siemens-Martin furnace. In accordance with the invention, the heat generating means may be such as to produce steam and/or hot water and/or hot air.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

The figure diagrammatically illustrates an apparatus arranged in accordance with the invention.

As shown in the figure, there is provided a cupola furnace 1 having a waste gas discharge conduit 2 from which hot waste gases may be discharged during the process of operation of the cupola furnace in melting iron material prior to its conversion into steel. The cupola furnace 1 operates with a hot air blast introduced by conduit 3, the hot air blast being introduced into the cupola furnace 1 in the known manner. Connected to the waste gas discharge conduit 2 of the cupola furnace 1 is a recuperator device 4 arranged for heating the air used for the hot air blast introduced into the cupola furnace 1.

Arranged in association with cupola furnace 1 is a Siemens-Martin or open hearth furnace 5 of known type and a waste-heat boiler 6, the boiler 6 being connected to the open hearth furnace 5 through the waste gas discharge conduit 7 thereof and being connected to the waste gas discharge conduit 2 of the cupola furnace 1.

In the particular embodiment shown in the figure, it will be seen that the waste gas discharge conduits of both cupola furnace 1 and open hearth furnace 5 are connected to the waste heat boiler 6 for supplying heat thereto.

Also shown in the figure is an arrangement wherein the liquid cooling devices used in the cupola and open hearth furnaces may be so interconnected that the water or other liquid utilized therein for cooling purposes may be conducted to the waste heat boiler for further heating or superheating. Such portions of the furnaces as door frames, ceiling fixtures and wall structures may be equipped with cooling devices normally carrying water which is heated during the cooling process, and the hot water or steam produced in these cooling systems may in accordance with the invention be conducted to the waste heat boiler 6. In the embodiment shown in the figure, such a cooling system may include a cooling device 8 for cooling the melting zone of the cupola furnace 1 and cooling apparatus 9, diagrammatically illustrated, for cooling the door, the ceiling and other structure of the open hearth furnace 5. The heated cooling medium is conducted by conduit 10 to the waste heat boiler 6, as shown in the figure.

In accordance with the invention particularly satisfactory results are obtained by operating the cupola furnace 1, which is arranged before the open hearth furnace 5, with a hot blast, the temperature of which is preferably considerably higher than 450° C., thus rendering the operation of the cupola more economical and more adaptable to operational requirements. This feature affords the possibility of not only using pig iron in the cupola but also of reducing ore, and of subjecting the reduced ore immediately afterwards while still liquid to further treatment in the open hearth furnace.

Normally, the waste gases of the cupola furnace 1 are not fully utilized for the production of hot blast for the cupola system, so that in accordance with another feature of the present invention, it is of advantage also to use the remaining waste gases of the cupola furnace 1 for the waste heat utilization plant, i. e., the waste heat boiler 6, and in particular for the steam and/or hot air generation plant of the Siemens-Martin or open hearth furnace. The waste gases of the cupola furnace 1 may, if desired, at first be led to a combustion chamber for discharge of latent heat.

The arrangement thus offers the widest possibilities of combination. In a co-ordinated recuperator plant for the hot blast cupola and the Siemens-Martin furnace, it is possible, for example, to heat the blast up to a certain temperature which would be normally sufficient for the cupola to be operated either in an acid or a basic process. Furthermore, the portion of the blast to used for the Siemens-Martin furance could be heated to the higher temperature required for the Siemens-Martin furnace in a special recuperator, or in a regenerative pre-heating system.

Such an arrangement is shown in the drawing, wherein there is illustrated a hot blast recuperator device 4 connected to the waste gas discharge conduit 2 of cupola 1 for not only heating the air to be used for the hot blast in the cupola 1, but also for pre-heating the air to be utilized in the Siemens-Martin furnace 5. For further heating of the latter air, a regenerator system 11, shown diagrammatically, is provided.

If the open hearth furnace is fired with the use of foreign gas, it is possible in accordance with a further development of the invention to construct a system which is particularly economical and profitable, especially with regard to the cost of construction. In this connection, the expression "foreign gas" is intended to signify a gas which is produced independently of the Siemens-Martin furnace and is conducted thereto at a low temperature, in contrast to generator gas which is produced in connection with the Siemens-Martin furnace and which is introduced therein at a high temperature. Within the meaning of the expression "foreign gas" in accordance with the invention, this gas may, therefore, consist of stack gas, distant gas, coke gas or natural gas.

The pre-heating of the combustion air for Siemens-Martin furnaces in recuperators has up to now not proved satisfactory, because normally it is necessary to heat the air to such high temperature, e. g., 900° and 1100° C., that the types of construction of recuperators which are generally used are not suited for this purpose, although the use of recuperators instead of the generally used regenerators would be of advantage.

The regenerator gas, which has a relatively low heat value, leaves the regenerator already at a high temperature, and in this hot condition is led to the Siemens-Martin furnace. When foreign gas is used, the gas arrives at the Siemens-Martin system with relatively low temperature, and although the kinds of foreign gases generally used have substantially higher heat value than the generated gas, high temperatures are necessary for the combustion air to attain the required furnace temperature.

Metallic recuperators generally in use at present allow pre-heating of combustion air only to about 700–800° C., according to the size of the recuperator. The combustion air in the recuperator may now by pre-heated to such temperatures for which suitable materials for the construction of the recuperators are available, if the foreign gas, also, is additionally pre-heated in the recuperator to a temperature as high as possible before it is conducted to the furnace.

In order to attain the required furnace temperature, it is necessary to have the required amount of heat available. In accordance with the system constructed according to the invention, the required amount of heat may be conducted to the furnace in such manner that, in addition to the recuperatively heated air, the gas is also heated recuperatively so that a correspondingly smaller portion of the combustion air is used for heating the gas. The temperature to which the gas is heated should be as high as possible. In most cases, however, the temperature will be limited by the composition of the gas. Coke gas, for example, when heated to a temperature higher than 350° C. easily deposits carbon, a factor which limits the height of the gas temperature. Depending on their composition, other kinds of gas may, however, be pre-heated to much higher temperatures.

In order that the temperature of the waste gases of the Siemens-Martin furnace entering the recuperator not be too high, with regard to the material of which the recuperator is constructed, the gas temperature may be reduced by adding fresh air thereto, or by waste gas recirculation.

The recuperators for pre-heating the combustion gas and the combustion air may be arranged as desired, i. e., either one after the other, or, more suitably, arranged parallel to one another. In a parallel arrangement, a blowing device providing a joint suction draft may be used for both recuperators, or a blowing machine providing a suction draft may be used for each recuperator. When operating with a joint suction draft device in a parallel arrangement, the throttle valves for the parallel waste gas flow will be arranged behind the recuperator so as to keep them within the area of low temperatures. It is, nevertheless, advisable to use water- or steam-cooled throttle valves. The pre-heated gas and air are led separately to the head of the Siemens-Martin furnace and are mixed in the burner.

It may be of advantage, particularly if the arrangement described is also to be used for relatively poor gas, to further heat the air, which is pre-heated in a metallic recuperator, in a ceramic recuperator or in a known arrangement of regenerators affording a corresponding reversibility.

Moreover, if a plant is arranged in accordance with the invention, all the remaining waste gases can be utilized for steam or hot water generation. It is also possible to feed the waste heat boiler 6 with additional fuel in the form of coke, coal dust, gas or the waste gas from the cupola. In this case, in particular, it may be of advantage to install in the combustion chamber radiation-heated air heating elements, e. g., tubes through which air passes at correspondingly high speed, which does not interfere with the simultaneous installation of tubes through which water or steam is to pass. Instead of a steam or hot water generator, a hot air generation plant may also be used, in which in a recuperative manner hot air, for example, with high pressure for the operation of a hot air turbine, may be produced. In any case, the combination in accordance with the invention affords the maximum utilization of all the heat available in such a system.

In a further feature of the invention, the surplus waste gases of the cupola furnace, if not required for the production of hot blast for the cupola, may be used as a heat supply for the Siemens-Martin furnace. All the waste gas of the cupola may be enriched with further combustible components and used also for heating the Siemens-Martin furnace, and the hot blast required for the cupola may be produced by using the waste gases of the Siemens-Martin furnace.

It will be understood that each of the elements described above, or two or more together, may also find a useful application in other types of heat generating and utilizing plants differing from the types described above.

While the invention has been illustrated and described as embodied in steel producing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Combined steel producing and waste heat recuperating apparatus comprising, in combination, an open hearth furnace for making steel from molten iron material and having discharge means for hot waste gases; cupola means including a cupola furnace for premelting iron material into molten iron material to be transferred to said open hearth furnace, and having waste gas discharge means for discharging hot waste gases; waste heat boiler means; liquid cooling means for said cupola furnace; means for admitting heated air into said cupola furnace; heating means connected to said waste gas discharge means of said cupola furnace and using part of said hot waste gases discharged from said cupola means for heating the heated air for introduction into said cupola furnace; first conduit means connected to said waste gas discharge means of both said cupola furnace and said open hearth furnace for conducting the remainder of the hot waste gases from said cupola furnace and the entire hot waste gases from said open hearth furnace to said waste heat boiler; and second conduit means connected to said liquid cooling means for conducting hot liquid obtained during cooling of said cupola furnace from said liquid cooling means to said waste heat boiler for further heating by said hot waste gases conducted thereto from said cupola furnace and said open hearth furnace by said first conduit means.

2. Combined steel producing and waste heat recuperating apparatus comprising, in combination, an open hearth furnace for making steel from molten iron material and having discharge means for hot waste gases; means for admitting heated air into said open hearth furnace; cupola means including a cupola furnace for premelting iron material into molten iron material to be transferred to said open hearth furnace, and having waste gas discharge means for discharging hot waste gases; waste heat boiler means; liquid cooling means for said cupola furnace; means for admitting heated air into said cupola furnace; first heating means connected to said waste gas discharge means of said cupola furnace and using a part of said hot waste gases discharged from said cupola means for heating the heated air for introduction into said cupola furnace; second heating means connected to said first heating means and using a part of the hot waste gases discharged from said cupola furnace for heating the heated air for introduction into said open hearth furnace; first conduit means connected to said waste gas discharge means of both said cupola furnace and said open hearth furnace for conducting the remainder of the hot waste gases from said cupola furnace and the entire hot waste gases from said open hearth furnace to said waste heat boiler; and second conduit means connected to said liquid cooling means for conducting hot liquid obtained during cooling of said cupola furnace from said liquid cooling means to said waste heat boiler for further heating by said hot waste gases conducted thereto from said cupola furnace and said open hearth furnace by said first conduit means.

3. Combined steel producing and waste heat recuperating apparatus comprising, in combination, an open hearth furnace for making steel from molten iron material and having discharge means for hot waste gases; means for admitting heated air into said open hearth furnace; cupola means including a cupola furnace for premelting iron material into molten iron material to be transferred to said open hearth furnace, and having waste gas discharge means for discharging hot waste gases; waste heat boiler means; liquid cooling means for said cupola furnace; means for admitting heated air into said cupola furnace; first heating means connected to said waste gas discharge means of said cupola furnace and using a part of said hot waste gases discharged from said cupola means for heating the heated air for introduction into said cupola furnace; second heating means connected to said first heating means and to said waste gas discharge means of said open hearth furnace and using a part of the hot waste gases discharged from said cupola furnace and from said open hearth furnace for heating the heated air for introduction into said open hearth furnace; first conduit means connected to said waste gas discharge means of both said cupola furnace and said open hearth furnace for conducting the remainder of the hot waste gases from said cupola furnace and from said open hearth furnace to said waste heat boiler; and second conduit means connected to said liquid cooling means for conducting hot liquid obtained during cooling of said cupola furnace from said liquid cooling means to said waste heat boiler for further heating by said hot waste gases conducted thereto from said cupola furnace and said open hearth furnace by said first conduit means.

4. Combined steel producing and waste heat recuperating apparatus comprising, in combination, an open hearth furnace for making steel from molten iron material and having discharge means for hot waste gases; cupola means including a cupola furnace for premelting iron material into molten iron material to be transferred to said open hearth furnace, and having waste gas discharge means for discharging hot waste gases; waste heat boiler means; liquid cooling means for said open hearth furnace; liquid cooling means for said cupola furnace; means for admitting heated air into said cupola furnace; heating means connected to said waste gas discharge means of said cupola furnace and using part of said hot waste gases discharged from said cupola means for heating the heated air for introduction into said cupola furnace; first conduit means connected to said waste gas discharge means of both said cupola furnace and said open hearth furnace for conducting the remainder of the hot waste gases from said cupola furnace and the entire hot waste gases from said open hearth furnace to said waste heat boiler; and second conduit means connected to said liquid cooling means of said open hearth furnace and of said cupola furnace for conducting hot liquid obtained during cooling of said open hearth furnace and said cupola furnace from said liquid cooling means to said waste heat boiler for further heating by said hot wsate gases conducted thereto from said cupola furnace and said open hearth furnace by said first conduit means.

5. Combined steel producing and waste heat recuperating apparatus comprising, in combination, an open hearth furnace for making steel from molten iron material and having discharge means for hot waste gases; means for admitting heated air into said open hearth furnace; cupola means including a cupola furnace for premelting iron material into molten iron material to be transferred to said open hearth furnace, and having waste gas discharge means for discharging hot waste gases; waste heat boiler means; liquid cooling means for said open hearth furnace; liquid cooling means for said cupola furnace; means for admitting heated air into said cupola furnace; first heating means connected to said waste gas discharge means of said cupola furnace and using a part of said hot waste gases discharged from said cupola means for heating the heated air for introduction into said cupola furnace; second heating means connected to said first heating means and to said waste gas discharge means of said open hearth furnace and using a part of the hot waste gases discharged from said cupola furnace and from said open hearth furnace for heating the heated air for introduction into said open hearth furnace; first conduit means connected to said waste gas discharge means of both said cupola furnace and said open hearth furnace for conducting the remainder of the hot waste gases from said cupola furnace and from said open hearth furnace to said waste heat boiler; and second conduit means connected to said liquid cooling means of said open hearth furnace and of said cupola furnace for conducting hot liquid obtained during cooling of said open hearth furnace and said cupola furnace from said liquid cooling means to said waste heat boiler for further heating by said hot waste gases conducted thereto from said cupola furnace and said open hearth furnace by said first conduit means.

References Cited in the file of this patent

UNITED STATES PATENTS

| Number | Name | Date |
|---|---|---|
| 406,871 | Bartlett | July 16, 1889 |
| 565,262 | Doherty | Aug. 4, 1896 |
| 1,941,562 | Lewis | Jan. 2, 1934 |
| 2,131,031 | Avery | Sept. 27, 1938 |
| 2,158,095 | Vierow | May 16, 1939 |
| 2,171,353 | Brassert | Aug. 29, 1939 |
| 2,167,596 | Vial | July 25, 1939 |
| 2,182,129 | Kuzell | Dec. 5, 1939 |
| 2,417,345 | Belbe | Mar. 11, 1947 |